United States Patent [19]

Schankler

[11] Patent Number: 4,540,134
[45] Date of Patent: Sep. 10, 1985

[54] FILM CORE WITH RESTRAINER

[76] Inventor: Martin Schankler, 12 New Dover Rd., East Brunswick, N.J. 08816

[21] Appl. No.: 579,444

[22] Filed: Feb. 13, 1984

[51] Int. Cl.³ .............................................. B65H 75/28
[52] U.S. Cl. ....................................................... 242/74
[58] Field of Search ............ 242/74, 71.8, 125, 125.1, 242/78.3

[56] References Cited

U.S. PATENT DOCUMENTS

| 1,357,345 | 11/1920 | Phelps | 242/74 X |
| 1,408,425 | 2/1922 | Passavanti | 242/74 |
| 2,951,656 | 9/1960 | Wellman | 242/74 X |
| 3,246,729 | 4/1966 | Bishop | 242/74 X |
| 3,982,709 | 9/1976 | Hertel | 242/74 |

Primary Examiner—Stuart S. Levy
Assistant Examiner—Lynn M. Sohacki
Attorney, Agent, or Firm—Thomas R. Farino, Jr.

[57] ABSTRACT

The disclosure relates to an improved core for holding web material. The core includes a cylinder having an axis of rotation and an axially extending slot for receiving the web material, a rectangular collar within the cylinder to form an annular channel and an annular channel floor between the cylinder and the column to maintain a substantially concentric relation there between. The core also includes first, second and third tapered rib members for positioning the web material within the annular channel and a channeled wall member mounted on the rectangular collar opposite a tapered rib member; a post is included within the annular channel in combination with a fourth tapered rib member adjacent thereto. A labyrinth of web material formed by threading an end of the web through the slot into the annular channel along the outer peripheral surface of the rectangular collar, adjacent a first tapered rib member, between a second tapered rib and the channel wall member, adjacent a third tapered rib around the post and adjacent the fourth tapered rib member winding back through the channel and out the slot. The cooperative action of the restraining effect of the post and adjacent wall on the web material, the extended frictional contact between the resulting two layers of web material and the frictional engagement of the web material about the outer peripheral surface of the rectangular collar securely restrain the web to the core during both winding and unwinding operations.

7 Claims, 2 Drawing Figures

FILM CORE WITH RESTRAINER

BACKGROUND OF THE INVENTION

The present invention is generally directed to an improved core for holding web material and in particular to a core for holding film within a film cartridge.

Cores for holding web material are well known in the art with such devices finding considerable application in film cartridges for microfilm readers.

In the use of film spools, for example, it is customary to wind film upon the spool by positioning one end of the film through a slot formed in the hub so that the film end may be at least momentarily held while the first few strands of film are wound.

The winding of film on reels has presented a problem because of the tendency of the core terminal portion of the strip of film to slip about the hub of the reel on which it is to be wound at the start of the rotational movement of the reel. The provision of a threading slot extending transversely through the hub of a reel, through which the film can be threaded, has proved to be insufficient to hold the end of the film at the start of the rotational movement of the reel on which the film is to be wound. The pulling force exerted on the strip of film at the start of the rotational movement of the reel pulls the end of the film out of the threading slot, unless some additional means is provided for holding the film end until the overlapping of the succeeding film convolutions establishes sufficient frictional restraint to prevent relative sliding movement between adjacent convolutions.

While film cores in the past have been generally successful, they have been relatively complicated and expensive to produce, requiring a number of individual parts. In fabricating such cores, it thereby becomes necessary to fabricate more than one part and to assemble the parts with the film in order to provide a complete cartridge.

It is, therefore, a general object of the present invention to provide a newly designed and improved core for holding web material.

It is a more specific object of the present invention to provide a newly designed and improved core for holding microfilm within a microfilm cartridge.

Additionally, it is a further object of the present invention to provide a core for holding film material which securely holds the film and which includes only a single part, thus rendering the improved core less expensive as to manufacture.

Additionally, it is a further object of the present invention to prevent separation of the microfilm from the cartridge core of an unwound reel during unwinding operations.

SUMMARY OF THE INVENTION

The present invention provides an improved core for storing web material which includes a cylinder having an axis of rotation and an axially extending slot for receiving the web material, a rectangular collar within the cylinder and substantially concentric with the cylinder about the axis of rotation, thereby forming an annular channel between the outer peripheral surface of the rectangular collar and the inner surface of the cylinder. The core contains spacing means between the cylinder and rectangular collar to maintain the cylinder and collar in a substantially fixed concentric relation and, in addition, contains first, second and third tapered rib members for positioning the web material within the channel. The core further contains a channeled wall member mounted on the rectangular collar opposite a tapered rib member, a post within the annular channel and a fourth tapered rib member adjacent the post whereby the labyrinth of web material formed by means of said web material being threaded through the slot into the annular channel, along the outer peripheral surface of the rectangular collar, adjacent a first tapered rib member, between a second tapered rib and channel wall member, adjacent a third tapered rib member, around the post and adjacent the fourth tapered rib member, back through the channel and out the slot, is securely restrained by means of the cooperative action of the restraining effect of the post and adjacent wall on the web material, the extended frictional contact between the resulting two layers of web material and the frictional engagement of the web material about the outer peripheral surface of the rectangular collar, notwithstanding pulling forces applied to the web.

It is recognized that maximum holding power is achieved when two layers of web material are in contact with each other for the greatest length possible. The present invention, through the labyrinth created, permits holding forces to be applied over a maximum length of the web material; the present invention also provides holding power over numerous winding and unwinding cycles in response to repeated pulling forces.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, and in the several figures of which like reference numerals identify like elements, and in which:

DESCRIPTION OF THE PREFERRED EMBODIMENT

Figure 1:
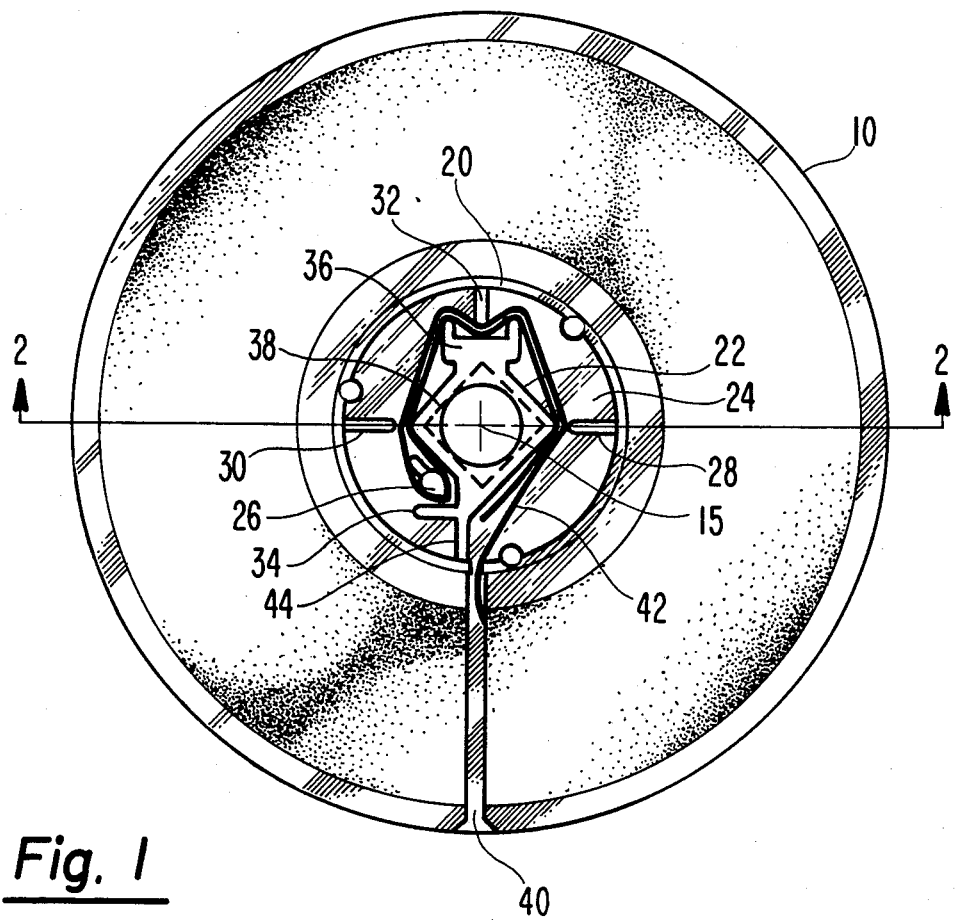
FIG. 1 is a top view of a core for holding web material embodying the present invention.

In the drawings, a film-holding reel 10 of known construction, rotatably about an axis 15, contains a core which comprises a cylinder 20, a rectangular collar 22, an annular floor 24, between the cylinder and rectangular collar, tapered rib members 28, 30, 32, and 34, post 26 and channelled wall member 36.

Figure 2:
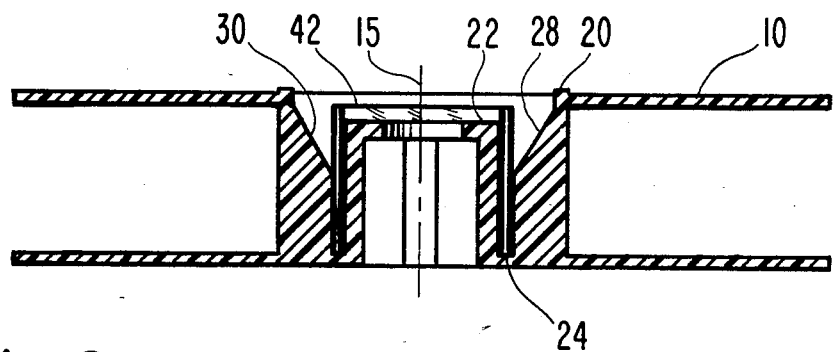
FIG. 2 is a cross section of view taken along lines 2—2 of FIG. 1.

The cylinder 20, is adapted to be received into film-holding reel 10, so as to confine the novel core as it rotates about its axis of rotation 15. In conventional manner, the core of FIGS. 1 and 2 is adapted to be driven by a keyed spindle and accordingly, rectangular collar 22, includes a keyed recessed portion 38, on its inner surface to engage the driven spindle.

The cylinder 20, includes an axial slot, 40 of sufficient width for receiving the web material, 42.

Rectangular collar, 22 is within the cylinder and is substantially concentric with the cylinder about axis of rotation, 15. According to this relationship, an annular floor, 24 is formed between the outer peripheral surface of rectangular collar, 22 and the inner surface of cylinder, 20. The annular channel floor, 24 extends between the cylinder and rectangular collar to provide spacing for the cylinder and rectangular collar and further to maintain the cylinder and rectangular collar in fixed substantially concentric relation. Axially slot, 40 communicates with the annular channel, 24 to provide access to the annular channel 24, for film 42.

The annular channel 24, includes four tapered rib members 28, 30, 32, and 34. Rib members 28, 30 and 32 are spaced ninety degrees apart from each other and are situated in contact with the inner surface of cylinder 20, extending from the floor of annular channel 24, to the top surface of cylinder 20, ribs 28, 30, and 32 containing a tapered top portion for directing the film against the outer surface of rectangular collar 22, and into the bottom of annular channel 24, in a manner to be described hereinafter.

Rectangular collar 22, includes channelled wall member 36, positioned opposite tapered rib member 32. Channelled wall member 36, maintains film material 42, in close abuttment with tapered rib member 32, and further provides an increased frictional surface for film material 42. Post 26, is situated within the annular channel 24, and is secured to and extends from the annular channel floor. Tapered rib member 34, is adjacent to post 26, and affixed to wall member 44, extending from the floor of annular channel 24, to the top surface of wall 44, having its upper portion tapered in design.

In securing the end of the film material 42, one end of the film is threaded through axial slot 40, into the annular channel 24, along the outer peripheral surface of rectangular collar 22, adjacent tapered rib 28, over channelled wall member 36, adjacent tapered rib members 32 and 30, around post 26, and adjacent tapered rib member 34, back through channel 24, and out slot 40, as shown in FIG. 1. The combination of film looped around post 26, in close relationship with wall member 34, and the film in contact with channelled wall member 36, in close proximity with tapered rib member 32, securely holds the film onto the core notwithstanding pulling forces applied to the film.

As a further aid to improve the holding power of the core and to increase the wrap of the labyrinth of web material, post 26, is positioned close in to rectangular collar 22, and in addition, channelled wall member 36, increases the frictional surface of rectangular collar 22.

While the preferred embodiment of this invention has been described relative to its use for holding and securing microfilm material, it, of course, may be utilized for restraining any other similar type of web material. The cooperative action of the restraining effect of the post and adjacent wall on the web material, the extended frictional contact between the resulting two layers of web material and the frictional engagement of the web material about the outer peripheral surface of the rectangular collar as extended by channelled wall member 36, causes the web to be securely held even though the ends of the web material are subjected to extreme pulling forces. Additionally, as the core rotates, the two layers of film are caused to become in frictional contact with each other to further aid in holding the film to the core.

The core of the present invention is comprised of a single part which may be molded out of plastic on a high production basis and at low cost. Additionally, as the core is comprised of only one part, there is no resulting assembly time required which achieves a further reduction in the cost of utilizing the core of the present invention.

Although one particular embodiment of the invention has been considered in detail herein, it will be understood that the description is intended to be illustrative, rather than restrictive, as many details may be modified or changed without departing from the spirit or scope of the invention.

I claim:

1. An improved core for storing web material comprising:
    a cylinder having an axis of rotation and an axially extending slot for receiving web material;
    a rectangular collar within said cylinder and substantially concentric with said cylinder about said axis of rotation thereby forming an annular channel between the outer peripheral surface of said rectangular collar and the inner surface of said cylinder, said annular channel communicating with said axial slot;
    spacing means between said cylinder and rectangular collar to maintain said cylinder and collar in fixed substantially concentric relation;
    first, second, and third tapered rib members for positioning said web material within said annular channel said rib members being spaced ninety degrees apart from each other;
    a channelled wall member mounted on said rectangular collar opposite a tapered rib member;
    a post within said annular channel and substantially adjacent to said rectangular collar;
    a fourth tapered rib member adjacent said post whereby the labyrinth of web material threaded through said slot into said annular channel, along the outer peripheral surface of said rectangular coller, adjacent a first tapered rib member, between a second tapered rib and said channelled wall member, adjacent a third tapered rib member, around said post and adjacent said fourth tapered rib member, back through said channel and out said slot, is securely restrained by means of the cooperative action of the restraining effect of said post and channelled wall member on the web material, the extended frictional contact between the resulting two layers of web material and the frictional engagement of the web material about the outer peripheral surface of said rectangular collar, notwithstanding pulling forces applied to the web.

2. A core for holding web material in accordance with claim 1 wherein said spacing means comprises an annular channel floor between said cylinder and rectangular collar.

3. A core for holding web material in accordance with claim 1 wherein said post is secured to and extends from the floor of said annular channel.

4. A core for holding web material according to claim 1 wherein said core is adapted to be rotated by a driven spindle and wherein said rectangular collar includes an axial recess on the inner surface thereof for engaging the driving spindle.

5. A core for holding web material in accordance with claim 1 wherein first, second and third tapered rib members are spaced ninety degrees apart from each other.

6. A core for holding web material in accordance with claim 1 wherein first, second, and third tapered rib members are situated in contact with the inner surface of said cylinder and extend from the floor of said annular channel to the top surface of said cylinder.

7. A core for holding web material in accordance with claim 1 wherein said channelled wall member maintains said web material in close contact with said tapered rib member and further increases the frictional surface of said rectangular collar.

* * * * *